US005973948A

United States Patent [19]

Hahn et al.

[11] Patent Number: 5,973,948

[45] Date of Patent: Oct. 26, 1999

[54] UNIVERSAL LINEAR POWER SUPPLY

[75] Inventors: Stan S. Hahn, Moraga; Sung Kee Baek, Martinez, both of Calif.

[73] Assignee: Advanced Mobile Solutions, Inc., Moraga, Calif.

[21] Appl. No.: 08/963,701

[22] Filed: Nov. 4, 1997

Related U.S. Application Data

[63] Continuation-in-part of application No. 08/670,247, Jun. 19, 1996, Pat. No. 5,684,689.

[51] Int. Cl.[6] .................. H02M 1/00

[52] U.S. Cl. .................. 363/146; 363/143; 439/131

[58] Field of Search .................. 363/141, 142, 363/143, 144, 145, 146; 439/131, 172

[56] References Cited

U.S. PATENT DOCUMENTS

| | | | |
|---|---|---|---|
| 3,851,182 | 11/1974 | Wallce | 307/23 |
| 4,543,624 | 9/1985 | Rumble | 363/146 |
| 4,890,217 | 12/1989 | Conway | 363/143 |
| 5,001,623 | 3/1991 | Magid | 363/143 |
| 5,159,545 | 10/1992 | Lee | 363/146 |
| 5,726,875 | 3/1998 | Hirabayshi et al. | 363/142 |

*Primary Examiner*—Peter S. Wong
*Assistant Examiner*—Rajnikant B. Patel
*Attorney, Agent, or Firm*—Nathan P. Koenig; Crosby, Heafey, Roach & May

[57] ABSTRACT

A universal linear power supply capable of automatically supplying a regulated DC current output from a range of AC input. In one preferred embodiment, interchangeable modular electrical plugs configured to mate with standard AC supplies releasably connect with the power supply. The power supply circuitry comprises a two-winding step-down transformer, a rectifier and a DC/DC step-down buck converter. A projection on selected electrical plugs mechanically engages a switch on the power supply, connecting the primary coils of the transformer either in series or in parallel to accommodate 110 VAC or 220 VAC input. In another preferred embodiment, the invention comprises an electrical plug for accessing VAC input connected, releasably or permanently, to a power supply comprising a linear transformer, a full-wave rectifier and a DC/DC step-down forward converter which is capable of accommodating the full range of standard AC voltage. The interchangeable plugs may further comprise a releasable locking means mechanically connected to the casing and designed to engage the electrical plug to maintain the plug in an operative position.

8 Claims, 7 Drawing Sheets

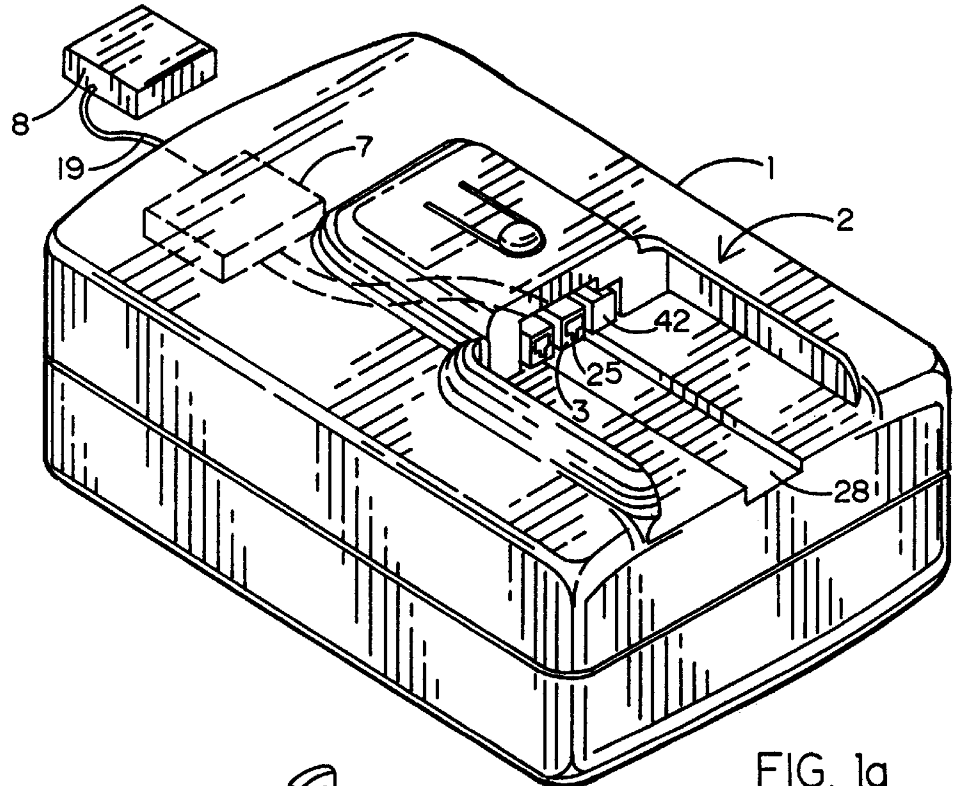
FIG. 1a
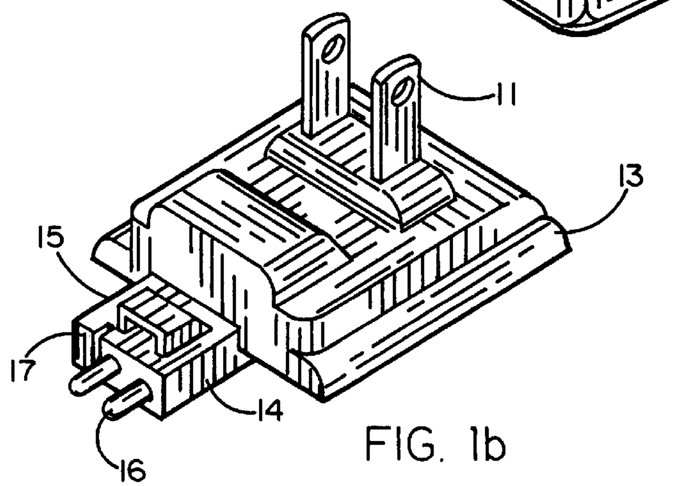
FIG. 1b
FIG. 1c
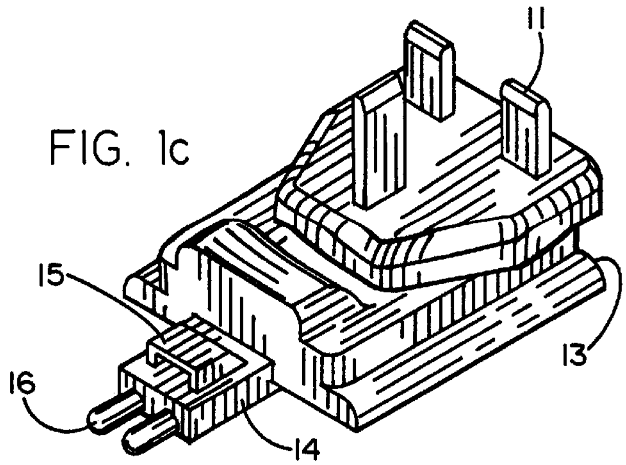

UNIVERSAL LINEAR POWER SUPPLY

RELATION TO OTHER APPLICATIONS

This application is a continuation-in-part of Ser. No. 08/670,247 filed Jun. 19, 1996, now U.S. Patent No. 5,684, 689, which is hereby incorporated in its entirety by reference.

BACKGROUND OF THE INVENTION

People rely heavily on a wide variety of electrical devices. Almost all of these devices draw power ultimately from a national standard source, usually delivered to the user through a wall outlet or socket. This leads to a challenge for the manufacturer of electrical devices destined for international use: while many electrical devices are sold for use throughout the world, there is no world standard for electrical plug configurations, size, shape, voltage or number of prongs. The wide variety of socket configurations in use worldwide burdens international suppliers of mobile products to varied countries and international travelers who wish to use electrical devices in a portable fashion. Moreover, different areas of the world use different voltage output standards. For example, in Europe and the U.K., the standard is 220 VAC, while in the U.S. the standard is 110 VAC.

Most industrial nations use a standardized alternating current supply with only two leads, a hot side and a neutral side. Some outlets specifically incorporate a separate earth or ground lead while others do not. A problem exists, therefore, with physically accessing an AC current source supplied through any number of outlet configurations and interfacing that current source with the appropriate input connections for a power supply or other electrical device.

The traditional solution for the mechanical prong configuration problem is to provide an adapter which includes a socket to accommodate the prongs of the electrical device integrated with a second set of prongs in a configuration for a local socket. These adapters have some serious flaws. One problem is that the adapters are bulky and at a minimum, cause the prongs of the original device to be extended by at least the length of the additional set of prongs. Since most plug devices are designed to be secured by spring tension and interaction with a wall plug, this can pose a significant mechanical disadvantage. The increased lever arm created by the additional prong length will tend to shift the plug downward, tending to pry the plug out of the wall socket. This will be true even for a light-weight plug.

The lever arm problem is accentuated with devices that are larger than a simple plug. Many power supplies and other electrical devices are designed to be wall-mounted at a wall socket. A typical power supply includes a casing which terminates in a plug designed to plug directly into the wall socket. The casing is often designed to lie against a wall to provide mechanical stability and to maintain the plug prongs in proper contact with the wall socket. If an adapter must be used, the unit loses the stability of resting against the wall and, because even a small amount of weight at the end of a lever arm will create a torque which will tend to pry the prongs out of the wall socket, such a plug adapter is generally unusable for such wall-mounted plug-in devices. Moreover, angling the plug severely can compromise the electrical connection to the point that the plug no longer is in electrical contact with source current. This type of angling may lead to partial separation from the wall socket and may expose the prongs of the plug in such a way that a person or animal might come into contact with live current, thereby causing bodily harm.

Another approach to accommodating multiple physical outlet configurations on a single device is to integrate an interchangeable plug apparatus into the device which allows for easy alteration of the device/outlet compatibility without compromising the device physical characteristics as outlined above. A number of improvements in the art of interchangeable plug design are disclosed in U.S. patent application Ser. Nos. 08/233,125, filed Apr. 26, 1994, 08/414,209, filed Mar. 30, 1995, and 29/044,048, filed Sep. 15, 1995, incorporated herein in their entireties by reference.

Both the adaptor and interchangeable plug approaches to solving the regional differences in outlet configuration fail to address the need to adjust the device electrical circuitry for compatibility with the output voltage associated with each particular source outlet configuration. Some power supply and electrical device manufacturers have addressed this issue by including an input supply adjustment switch on the device or power supply. However, failure to properly adjust such a switch before connecting to the outlet could damage the device, endanger the user and lead to a failure of the electrical circuit connected to the utilized outlet.

Parent application Ser. No. 08/670,247 represents a further refinement in this area. It discloses a system of interchangeable plugs that automatically accommodate the source voltage. This design does require, however, that each plug have an internal wiring configuration appropriate to connect the source voltage with the power supply's transformer coils in order to achieve the correct conversion. Moreover, such interchangeable plugs may be used only with this power supply and conversely, interchangeable plugs designed for other power supplies will not work. Finally, this system requires a three-winding step-down transformer to accommodate the wiring of the interchangeable plugs.

Accordingly, there remains a need for a simplified universal power supply that automatically adjusts to the source voltage and provides a regulated DC output of the desired voltage. There is also a need for such a power supply which can utilize low cost two-winding step down transformers and readily interchangeable plugs that do not require internal wiring. This invention satisfies these and other needs.

SUMMARY OF THE INVENTION

One embodiment of his invention comprises an interchangeable plug power supply including a casing, an electrical plug detachably mounted in the casing and movable between a detached and an engaged, operative position, and a power supply configured to provide a regulated DC output. The power supply comprises a two-winding step-down transformer, a rectifier and a DC/DC step-down buck converter. Preferably, selected electrical plugs further comprises a projection configured to mechanically engage a switch on the power supply casing to adapt the circuitry to 110 VAC or 220 VAC input. In another embodiment, the invention comprises an electrical plug for accessing AC input connected, releasably or permanently, to a power supply comprising a linear transformer, a full-wave rectifier and a DC/DC step-down forward converter and is capable of accommodating the full range of standard AC voltage without the necessity of a mechanical switch. Yet another preferred feature comprises a releasable locking means mechanically connected to the casing and designed to engage the electrical plug to maintain the plug in an operative position. The locking means can be released by a user to allow the plug to be moved to the detached position. A preferred form of locking mechanism is a depressible lock bar which is designed to engage a detent in the plug. The depressible lock bar is connected to or integral with the casing.

BRIEF DESCRIPTION OF THE DRAWINGS

The aforementioned advantages of the invention, as well as additional advantages thereof, will be more fully understood as a result of a detailed description of the preferred embodiment when taken in conjunction with the accompanying drawings in which:

FIG. 1, comprising FIGS. 1A, 1B, 1C, 1D and 1E, illustrates perspective views of illustrative interchangeable plugs of the present invention and showing several interchangeable plugs usable in the inventive power supply device.

FIG. 3, comprising

DETAILED DESCRIPTION OF A PREFERRED EMBODIMENT

Figure 1D:
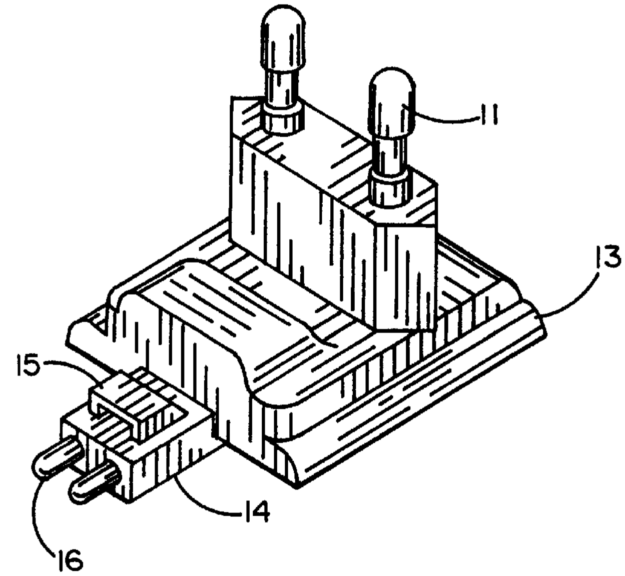
Figure 1E:
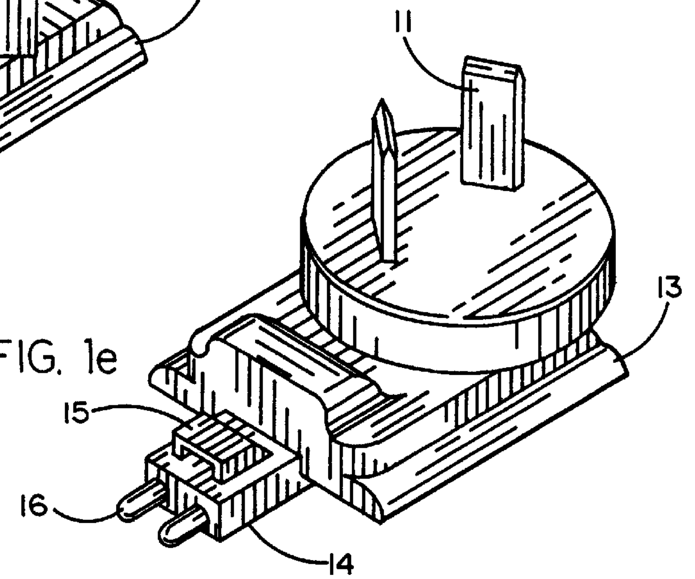

A preferred embodiment of the present invention includes a casing, a plug mounted to the casing, a locking device to secure the mounted plug, and a power supply capable of accommodating a wide range of source voltage while providing a linear regulated DC output.

Referring to FIGS. 1A, 1B, 1C, 1D and 1E, casing 1 includes cavity 2 with channel 28 which is designed to accommodate any one of the plugs 13 depicted in the figures with tongue 14. FIG. 1 B illustrates a plug designed for the United Kingdom, FIG. 1C for the United States, FIG. 1D for Europe and FIG. 1E for Australia. A plug 13 configured for use with 110 VAC supply may preferably include a projection 17 configured to engage a switch 42 housed in casing 1. Plug characteristics for other countries such as South Korea, can easily be integrated into the present invention. Sockets 3 with conductors 25, are designed to accommodate conducting members 16 of plugs 13 (see FIGS. 1A–1D). In a preferred embodiment, casing 1 is preferably made of high impact thermoplastic material, with top and bottom halves which can be sealed together by ultrasonic bonding.

In one embodiment, shown in FIG. 1A, power supply 7, preferably a linear power supply (FIGS. 5 and 7) contained on a printed circuit board, receives input power from conducting pins 25. Power supply 7 selectively forwards DC power through electrical cable 19 to electronic device 8.

Figure 2:
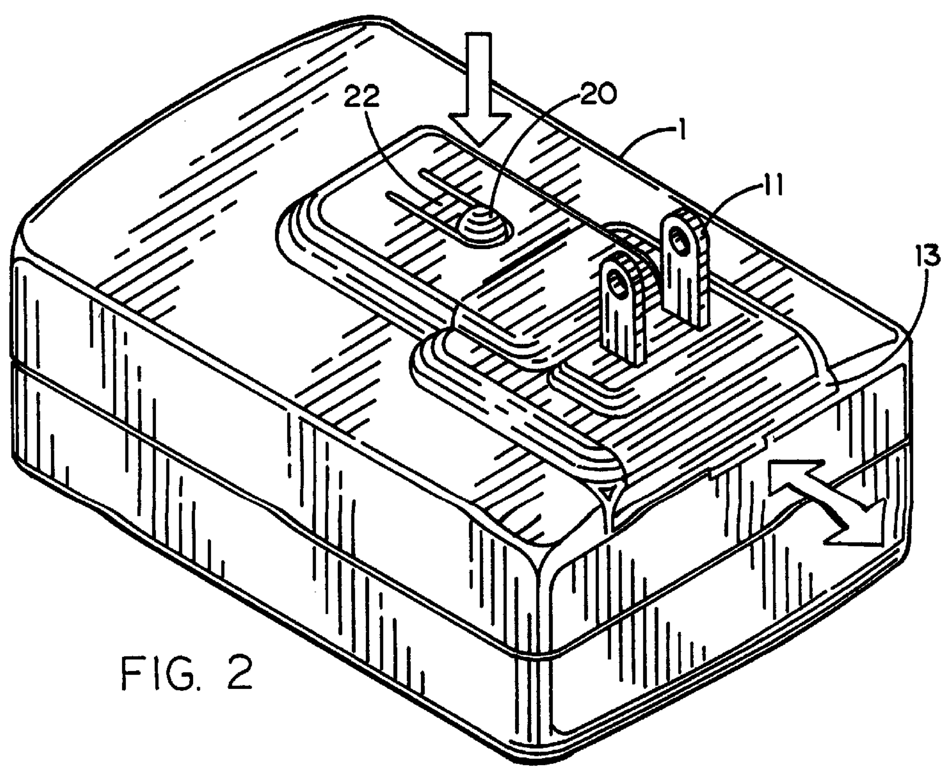
FIG. 2 illustrates a perspective view of the inventive power supply device, including an interchangeable plug with automatic voltage selection feature, showing a representative interchangeable plug in an operative position.
Figure 3A:
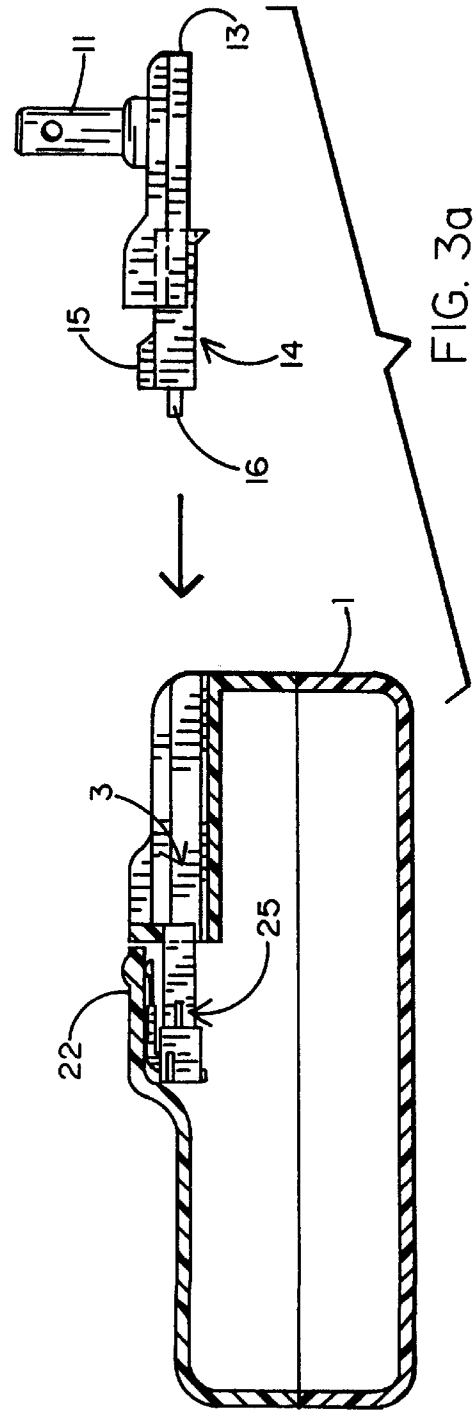
FIGS. 3A and 3B illustrates a cross-section of the device, showing a removable plug body and carrier ready to be connected to the device (FIG. 3A) and connected (FIG. 3B).
Figure 3B:
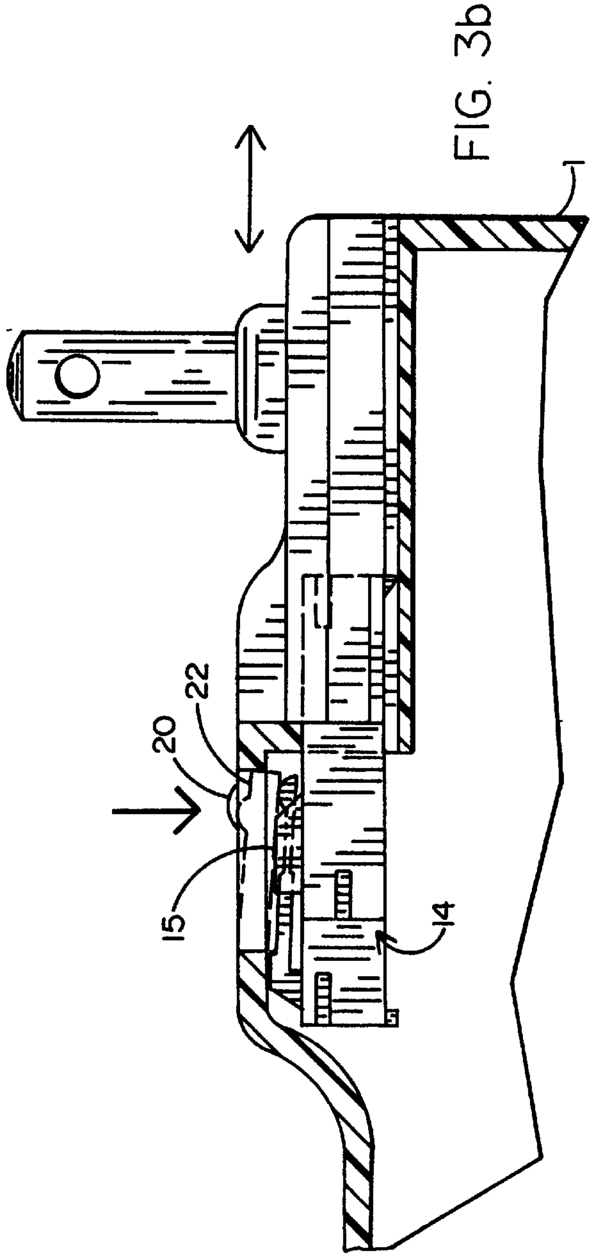

FIG. 2 provides an isometric profile and FIG. 3B illustrates a cutaway view of the interchangeable plug feature of a preferred embodiment of the inventive device in an operative position integrated with the casing. Casing 1 includes various features to support and position various components of the device. Plug 13 is a generally rectangular element with a centered tongue 14. Detent 15, shown in greater detail in FIGS. 1A–1D, is integral with tongue 14.

FIGS. 3A and 3B show lock bar 22 deformably positioned within casing 1. Lock bar 22 is made of a suitable material, such as a plastic material, which is resilient, tends to return to a preferred position, and can be secured at one end and be bent repeatedly to perform the needed release function yet return to a resting position with enough tension to perform the needed latch function. Lock bar 22 is preferably formed integral with casing 1. Release button 20 is connected to or preferably integral with lock bar 22. Lock bar 22 is designed to engage detent 15. Detent 15 is shaped to accommodate the configuration of lock bar 22.

When a plug 13 and casing 1 are integrated into a singular unit, lock bar 22 is pressed against detent 15 by the natural tension and resilience of lock bar 22. To release the plug 13 from the casing 1, release button 20 is depressed, which moves lock bar 22 away from casing 1 and from detent 15. Plug 13 can then be disengaged from casing 1.

The pressure of lock bar 22 against detent 15 will maintain each plug 13 in the operative position until a user activates release button 20, moving it from a resting position to a released (depressed) position as shown in FIG. 3B. Once the release button is moved and lock bar 22 is removed from detent 15 at least far enough so that the plug 13 can slide freely, the user can move plug 13 away from casing 1. Although conducting sleeves 16 may remain hot electrical leads after plug 13 is removed, a user or passerby is protected from inadvertent contact with the conducting pins by their submerged position relative to the plug 13.

Figure 4:
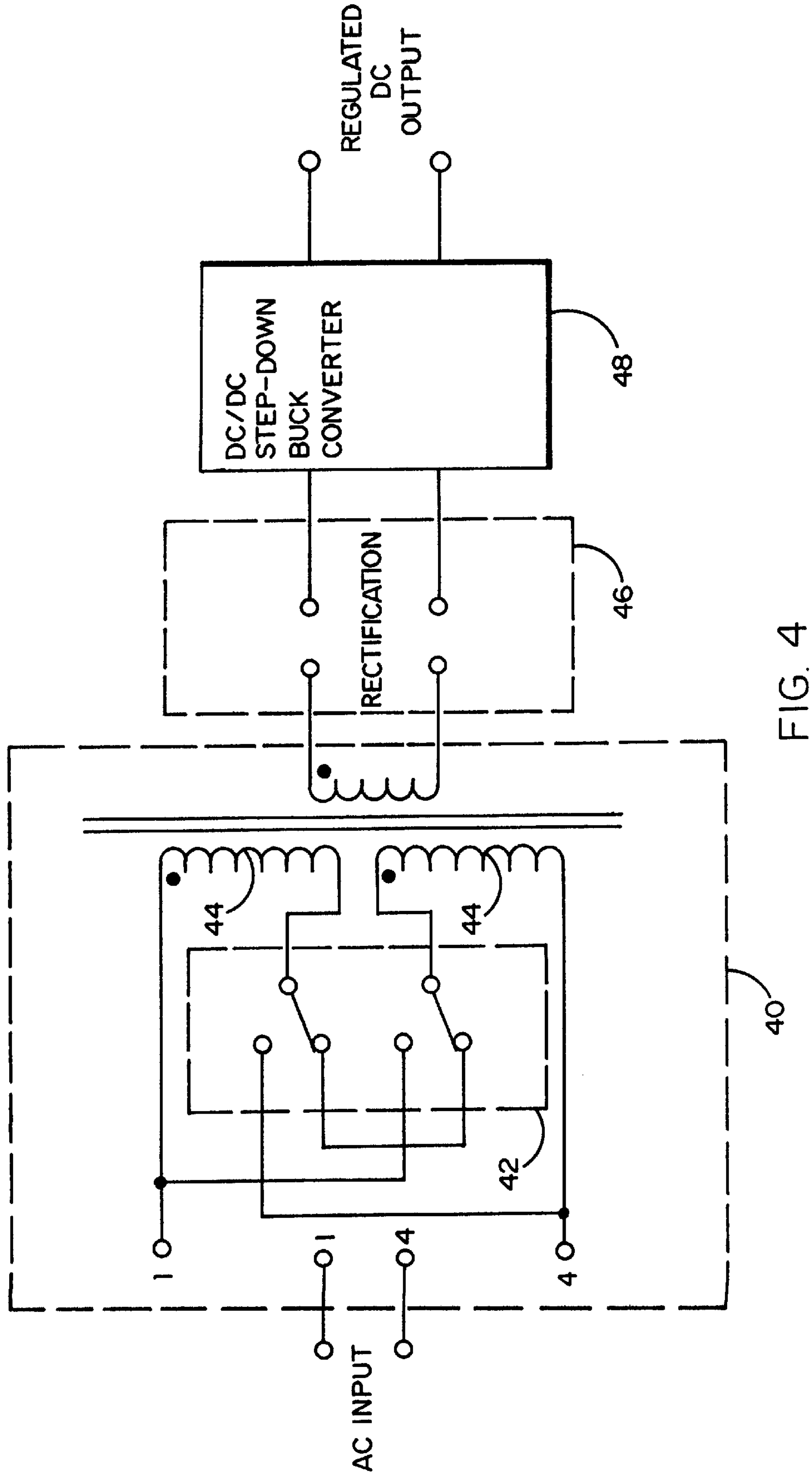
FIG. 4 is a block diagram of the power supply wiring of a preferred embodiment of the invention including a schematic of the switching mechanism for discriminating between source voltages for a preferred embodiment of the invention.
Figure 5:
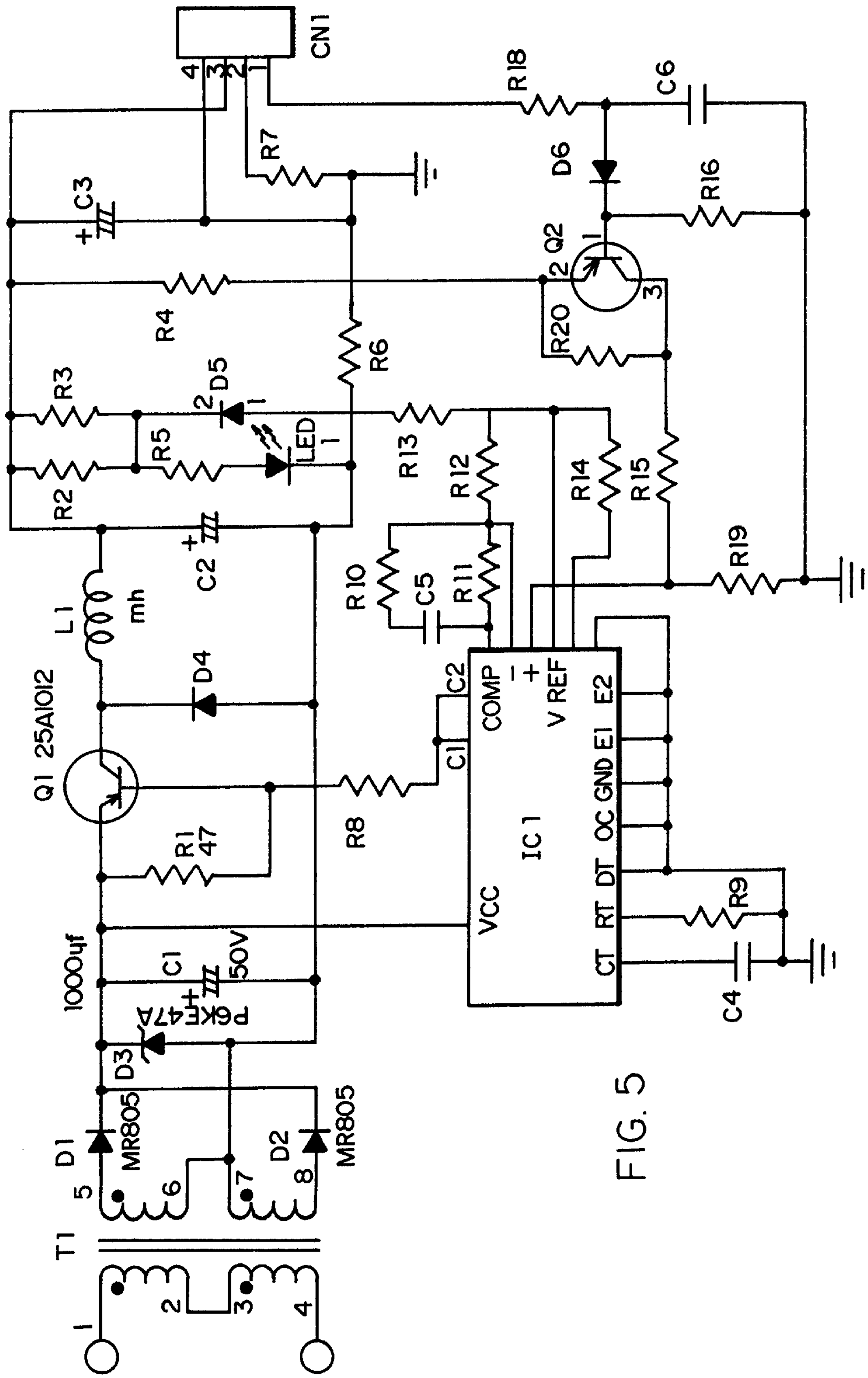
FIG. 5 is an exemplary circuit diagram of the power supply for the embodiment of the invention shown in FIG. 4.

FIG. 4 schematically illustrates the power supply wiring of one preferred embodiment of the invention. Transformer 40 is fed current from the wall outlet (not shown) through a springloaded, momentary double-pole double-throw (DPDT) switch 42 which engages the primary coils 44 of the transformer either in series or in parallel. Output from transformer 40 is then rectified 46 and fed to DC/DC step-down buck converter 48 which produces a constant voltage DC output. FIG. 5 shows an exemplary circuit diagram suitable for use in this embodiment of the invention. Plug 13 configured for use with a 110 VAC supply (FIG. 1C) further comprises a projection 17, configured to engage switch 42. As shown in FIG. 4, when switch 42 is not engaged by projection 17 on plug 13, switch 42 connects primary coils 44 in series to accommodate a 220 VAC supply. When switch 42 is engaged by projection 17 on plug 13, it connects primary coils 44 in parallel to accommodate a 110 VAC supply. This configuration prevents overload and damage if a 110 VAC plug is used that does not engage the switch. In other embodiments, switch 42 could also activate a conventional voltage detection and cutoff circuit. Such a circuit would detect voltages in significant excess of 110 VAC to safeguard against switch 42 getting stuck in the engaged position.

Figure 6:
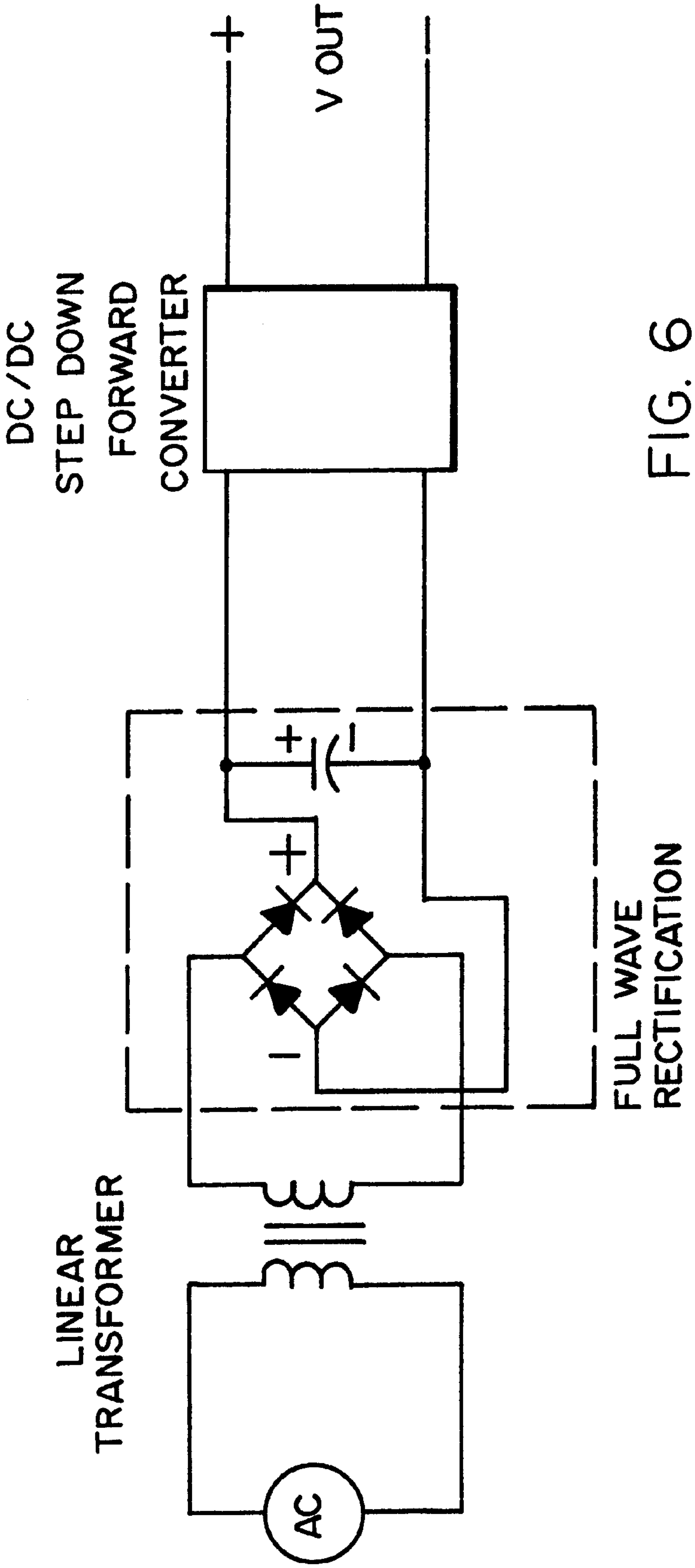
FIG. 6 is a block diagram of the power supply wiring of another preferred embodiment of the invention.

In another embodiment, shown as a block diagram in FIG. 6, a power supply circuit which can accommodate 110 VAC or 220 VAC without mechanical switching may be employed. The goal of such a circuit is to provide low-cost power supply capable of automatically accommodating input ranging from 90 to 264 VAC. Existing linear power supplies generally provide a constant DC output only when supplied current in relatively narrow ranges: either 105 to 128.7 VAC or 210 to 257.4 VAC. Such power supplies are inadequate in view of the standard ranges of 90 to 132 VAC and 180 to 264 VAC encountered internationally.

Figure 7:
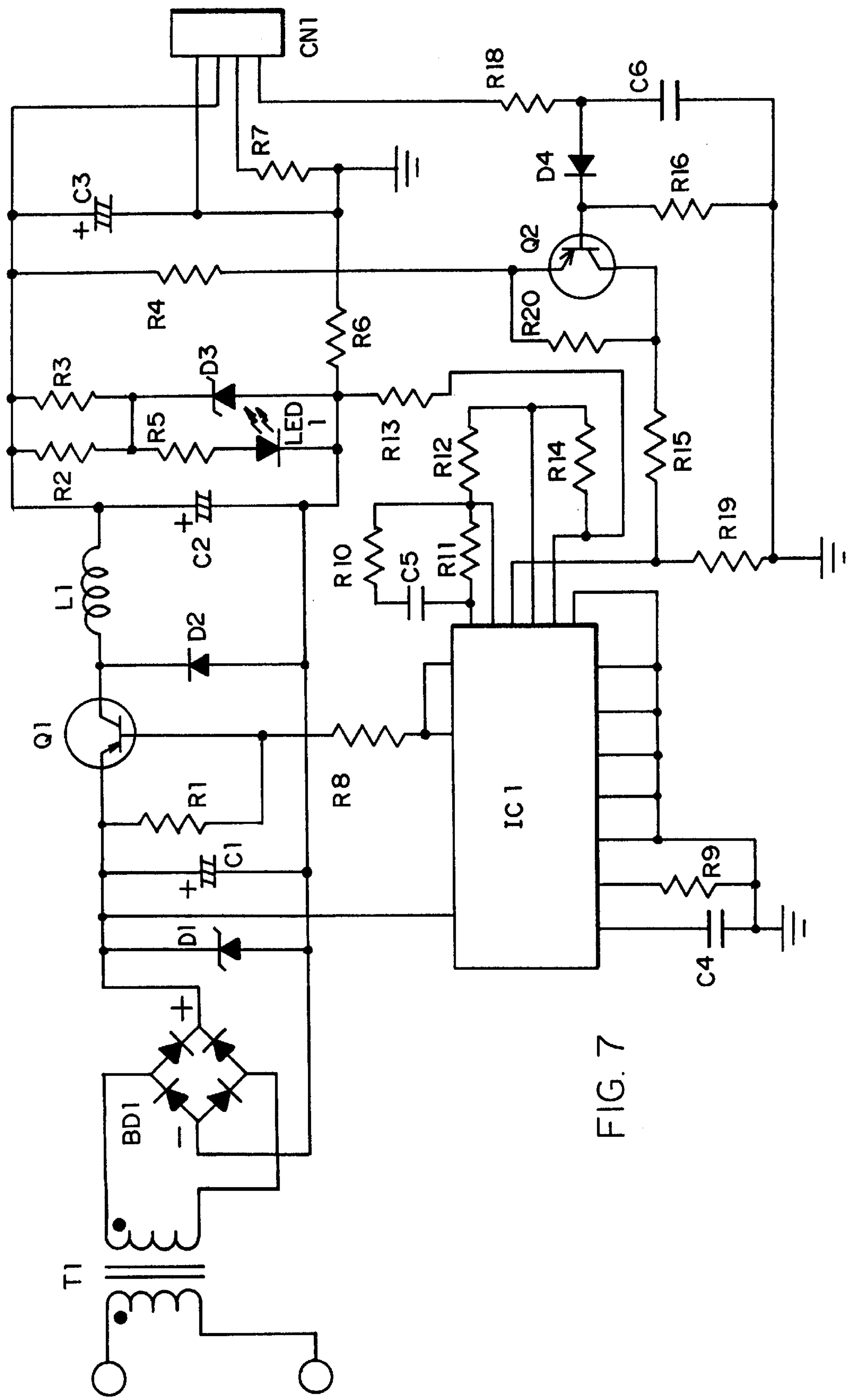
FIG. 7 is a circuit diagram of the power supply for the embodiment of the invention shown in FIG. 6.

Thus, this embodiment of the invention comprises linear transformer 50 feeding rectifier 52 which then supplies DC current to forward converter 54 which produces regulated DC output at the desired voltage. Preferably, linear transformer 50 steps down the AC input by a factor of 10 to produce AC output of about 9 to 26.4 VAC. Full-wave rectifier 52 then converts this to DC current of the same range. Finally, DC/DC step down forward converter 54 produces regulated DC output of the desired voltage. An exemplary circuit diagram suitable for this embodiment of the invention is shown in FIG. 7. Thus, in this embodiment, any AC input in the range of 90 to 264 VAC may be used to produce a low-voltage regulated DC output of up to about 15 watts.

A number of additional features of the interchangeable plug element of the present invention are disclosed in copending U.S. patent application Ser. Nos. 08/233,125, filed Apr. 26, 1994, 08/414,209, filed Mar. 30, 1995, and 08/670,247, filed Jun. 19, 1996 already incorporated by reference.

A general description of the device and method of using the present invention as well as a preferred embodiment of the present invention has been set forth above. One skilled in the art will recognize and be able to practice many changes in many aspects of the device and method described above, including variations which fall within the teachings of this invention. The spirit and scope of the invention should be limited only as set forth in the appended claims and their equivalents.

What is claimed is:

1. An AC universal power conversion apparatus comprising:

a plurality of electrical plugs each having a pin configuration suitable for compatible connection to a selected AC line having a different standard voltage wherein a first electrical plug further comprises a projection; and a casing for releasably receiving the electrical plugs, comprising power supply circuitry, connectors for providing an electrical connection between the electrical plug and the power supply circuitry, and a switch having a first and second position which is configured to be engaged by the projection on the first electrical plug; wherein the power supply circuitry comprises a transformer having primary coils, a rectifier and a DC/DC step-down buck converter such that the primary coils are connected to the electrical plug in series when the switch is in the first position and the primary coils are connected to the electrical plug in parallel when the switch is in the second position.

2. The universal power supply apparatus of claim 1, comprising two electrical plugs wherein the first electrical plug is configured to connect with a standard 110 VAC supply and a second electrical plug is configured to connect with a standard 220 VAC supply.

3. The universal power supply apparatus of claim 2, wherein the projection of the first electrical plug engages the switch, placing the switch in the second position.

4. The universal power supply apparatus of claim 1, wherein the power supply circuitry produces a regulated DC output when the electrical plug is connected to a AC supply having a range of 90 to 132 VAC or 180 to 264 VAC.

5. The universal power supply apparatus of claim 1, wherein the power supply circuitry further comprises a voltage detection and cutoff subcircuit connected to the transformer.

6. A universal power supply apparatus comprising:

an electrical plug having a pin configuration suitable for compatible connection to a selected AC line having a standard voltage; and power supply circuitry connected to the electrical plug and comprising in sequence a linear transformer, a full-wave rectifier and a regulating DC/DC step-down forward converter, wherein the power supply circuitry produces a regulated DC current output when the electrical plug is connected to an AC line having a voltage with a range from about 90 VAC to about 264 VAC.

7. The universal power supply of claim 6 wherein the electrical plug is releasably connected to the power supply circuitry.

8. The universal power supply of claim 7, further comprising a plurality of electrical plugs, each electrical plug having a pin configuration suitable for compatible connection to a different AC line.

* * * * *